(12) United States Patent
Omosako et al.

(10) Patent No.: US 11,504,797 B2
(45) Date of Patent: Nov. 22, 2022

(54) METHOD FOR MANUFACTURING ELECTROSEAMED METAL TUBE

(71) Applicants: Nippon Steel Nisshin Co., Ltd., Tokyo (JP); Nippon Steel Nisshin Pipe Co., Ltd., Tokyo (JP)

(72) Inventors: Kouji Omosako, Tokyo (JP); Makoto Akiduki, Tokyo (JP); Shigenobu Igawa, Aichi (JP); Yasumasa Makihara, Aichi (JP); Ryota Tanaka, Aichi (JP)

(73) Assignees: Nippon Steel Nisshin Co., Ltd., Tokyo (JP); Nippon Steel Nisshin Pipe Co., Ltd., Tokyo (JP)

( * ) Notice: Subject to any disclaimer, the term of this patent is extended or adjusted under 35 U.S.C. 154(b) by 421 days.

(21) Appl. No.: 16/849,710

(22) Filed: Apr. 15, 2020

(65) Prior Publication Data

US 2020/0238431 A1 Jul. 30, 2020

Related U.S. Application Data

(62) Division of application No. 16/482,639, filed as application No. PCT/JP2018/004474 on Feb. 8, 2018, now Pat. No. 10,906,125.

(30) Foreign Application Priority Data

Feb. 13, 2017 (JP) ................................. 2017-023869

(51) Int. Cl.
*B23K 13/04* (2006.01)
*B23K 9/02* (2006.01)
(Continued)

(52) U.S. Cl.
CPC ............ *B23K 13/046* (2013.01); *B21C 37/08* (2013.01); *B21C 37/083* (2013.01);
(Continued)

(58) Field of Classification Search
CPC ... B21C 37/08; B21C 37/083; B23K 11/0873; B23K 13/00; B23K 13/046;
(Continued)

(56) References Cited

U.S. PATENT DOCUMENTS 5,942,132 A ‡ 8/1999 Toyooka ............. B21C 37/0811
219/61
6,379,821 B2 4/2002 Kushida et al.
(Continued)

FOREIGN PATENT DOCUMENTS

CN 1170643 1/1998
CN 103269811 ‡ 8/2013
(Continued)

OTHER PUBLICATIONS

International Search Report with English translation and Written Opinion, counterpart International App. No. PCT/JP2018/004474 (dated May 1, 2018) (9 pages).
(Continued)

*Primary Examiner* — Quang T Van
(74) *Attorney, Agent, or Firm* — Cook Alex Ltd.

(57) ABSTRACT

A method for manufacturing an electric resistance welded metal pipe by butting side ends of a metal strip against each other and then welding the side ends by high frequency heating to manufacture an electric resistance welded metal pipe, each side end being provided with an inner surface side corner portion located on an inner surface side of the electric resistance welded metal pipe, the method includes a step of forming an inclined surface at the inner surface side corner portion before butting the side ends of the metal strip, and wherein the side ends are butted and welded to each other such that the inclined surface remains on an excess metal of the metal pipe after electric resistance welding and a discharged metal is not welded to the excess metal.

4 Claims, 2 Drawing Sheets

(51) Int. Cl.
| | |
|---|---|
| *B21C 37/08* | (2006.01) |
| *B21C 37/083* | (2006.01) |
| *C22C 38/00* | (2006.01) |
| *C22C 38/02* | (2006.01) |
| *C22C 38/04* | (2006.01) |
| *C22C 38/14* | (2006.01) |
| *F16L 9/02* | (2006.01) |
| *B23K 103/04* | (2006.01) |

(52) U.S. Cl.
CPC .......... *C22C 38/002* (2013.01); *C22C 38/02* (2013.01); *C22C 38/04* (2013.01); *C22C 38/14* (2013.01); *F16L 9/02* (2013.01); *B23K 2103/04* (2018.08)

(58) Field of Classification Search
CPC .......... B23K 2101/06; B23K 2103/04; C22C 38/002; C22C 38/02; C22C 38/04; C22C 38/14; F16L 9/02
USPC ....... 219/777, 608, 615, 616, 617, 619, 635, 219/643, 645, 646, 61, 61.2, 61.11, 61.12, 219/61.13, 61.3, 61.5; 138/171, 177; 428/685, 682, 686
See application file for complete search history.

(56) References Cited

U.S. PATENT DOCUMENTS

| | | | |
|---|---|---|---|
| 8,920,583 B2 | 12/2014 | Asahi et al. | |
| 2009/0223935 A1 ‡ | 9/2009 | Kenmochi | ......... B21C 37/0822 219/61 |
| 2012/0118426 A1 ‡ | 5/2012 | Daniel | .................. F16L 9/17 138/17 |
| 2012/0325805 A1 | 12/2012 | Hasegawa et al. | |
| 2013/0037162 A1* | 2/2013 | Shinohara | .......... B23K 35/3073 138/171 |
| 2013/0092279 A1 ‡ | 4/2013 | Daniel | .................. B21C 37/083 138/15 |
| 2018/0243809 A1 | 8/2018 | Okabe et al. | |

FOREIGN PATENT DOCUMENTS

| | | | |
|---|---|---|---|
| CN | 103752643 | ‡ | 4/2014 |
| JP | S52-125031 | ‡ | 9/1977 |
| JP | S58-122121 | ‡ | 7/1983 |
| JP | H2-80180 | ‡ | 3/1990 |
| JP | H2-160189 | ‡ | 6/1990 |
| JP | H4-1 80537 | ‡ | 6/1992 |
| JP | H4-180537 | | 6/1992 |
| JP | H8-57661 | ‡ | 3/1996 |
| JP | 2004-1 48337 | ‡ | 5/2004 |
| JP | 2004-148337 | | 5/2004 |
| JP | 2008-1 05075 | ‡ | 5/2008 |
| JP | 2008-105075 | | 5/2008 |
| JP | 2013-226585 | ‡ | 11/2013 |
| JP | 2015-074007 | | 4/2015 |
| JP | 2015-147239 | ‡ | 8/2015 |

OTHER PUBLICATIONS

Decision to Grant a Patent, counterpart Japanese App. No. 2018-508788, with English translation, (dated Jun. 10, 2019) (5 pages).
Written Opinion, counterpart Japanese App. No. 2018-508788, with English translation, (dated Mar. 13, 2019) (6 pages).
Notification of Reasons for Refusal, counterpart Japanese App. No. 2018-508788, with English translation (dated Jan. 7, 2019) (6 pages).
English translation of International Preliminary Report on Patentability for corresponding International application No. PCT/JP2018/004474 (dated Aug. 22, 2019) (7 pages).
Office Action and Search Report, corresponding Chinese application No. 201880009776 (dated Nov. 26, 2020) (8 pages).

* cited by examiner
‡ imported from a related application

METHOD FOR MANUFACTURING ELECTROSEAMED METAL TUBE

The present application is a divisional of U.S. application Ser. No. 16/482,639, which is a U.S. National Stage of PCT International Patent Application No. PCT/JP2018/004474, filed Feb. 8, 2018, which claims priority to JP Application No. 2017-023869, filed Feb. 13, 2017, all of which are hereby incorporated herein by reference.

TECHNICAL FIELD

The present invention relates to a method for manufacturing an electric seamed tube (electric resistance welded metal pipe) by butting side ends of a metal strip against each other and then welding the side ends by means of high frequency heating, and to the electric resistance welded metal pipe,

BACKGROUND ART

A method for manufacturing this type of electric resistance welded metal pipe conventionally used and the electric resistance welded metal pipe are disclosed, for example in patent document 1. The prior art carries out electric resistance welding after providing a tapered shape with each side end of the metal strip, in order to remove a penetrator from welded portions.

CITATION LIST

Patent Literature: Japanese Patent Application Publication No. 2008-105075 A.

SUMMARY

Technical Problem

Even if the penetrator has been removed from the welded portions as in the prior art, cracking might take place in the welded portions of the electric resistance welded pipe when subjecting the electric resistance welded pipe to severe processing such as 90° bending.

As a result of detailed studies of cracking of the welded portions, the following new findings have been obtained, That is, a discharged metal discharged from the welded portion has decreased toughness due to an influence of heat, and has tended to generate cracking due to severe processing. Observation of the welded portions where the cracking has been generated has indicated that the cracking generated in the discharged metal has been propagated to a base material through an excess metal.

The present invention has been made to solve the above problems. An object of the present invention is to provide a method for manufacturing an electric resistance welded pipe and the electric resistance welded pipe, which can avoid the propagation of the cracking to the base material even if the cracking is generated in the discharged metal.

Solution to Problem

A method for manufacturing an electric resistance welded metal pipe according to the present invention is a method for manufacturing an electric resistance welded metal pipe by butting side ends of a metal strip against each other and then welding the side ends by high frequency heating to manufacture an electric resistance welded metal pipe, each side end being provided with an inner surface side corner portion located on an inner surface side of the electric resistance welded metal pipe, wherein the method comprises a step of forming an inclined surface at the inner surface side corner portion before butting the side ends of the metal strip; and wherein the side ends are butted and welded to each other such that the inclined surface remains on an excess metal of the metal pipe after electric resistance welding and a discharged metal is not welded to the excess metal.

The electric resistance welded metal pipe according to the present invention comprises: a metal pipe body having a butted welded portion; an excess metal; and a discharged metal, the excess metal and the discharged metal being formed on the butted welded portion, wherein the excess metal comprises an inclined surface, and the discharged metal is not welded to the excess metal.

Advantageous Effects of Invention

According to the method for manufacturing the electric resistance welded metal pipe and the electric resistance welded metal pipe of the present invention, the side ends are butted and welded to each other such that the inclined surface remains on the excess metal of the metal pipe after electric resistance welding and the discharged metal is not welded to the excess metal, so that the propagation of the cracking to the base metal can be avoided even if the cracking is generated in the discharged metal.

DESCRIPTION OF THE PREFERRED EMBODIMENTS

Hereinafter, embodiments according to the present invention will be described with reference to the drawings.

Embodiment 1

Figure 1:
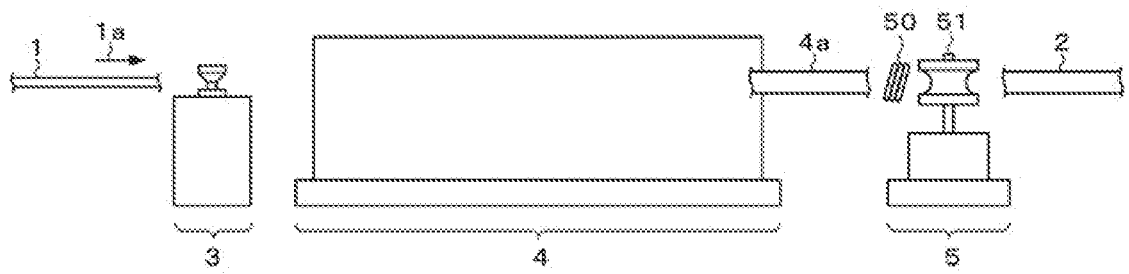
FIG. 1 is an explanatory view showing an electric resistance welded metal pipe manufacturing apparatus for carrying out a method for manufacturing an electric resistance welded metal pipe according to Embodiment 1 of the present invention.

FIG. 1 is an explanatory view showing an electric resistance welded metal pipe manufacturing apparatus for carrying out a method for manufacturing an electric resistance welded metal pipe according to Embodiment 1 of the present invention. The electric resistance welded metal pipe manufacturing apparatus in FIG. 1 is an apparatus for manufacturing an electric resistance welded metal pipe 2 from a metal strip 1 in a form of flat plate. The electric resistance welded metal pipe manufacturing apparatus is provided with a crushing apparatus 3, a forming roll group 4; and a welding apparatus 5.

The crushing apparatus 3 is an apparatus for correcting shapes of the side ends of the metal strip 1. The crashing apparatus 3 will be described later with reference to the drawing.

The forming roll group 4 is configured by a plurality of forming rolls, and is disposed on a downstream side of the crashing apparatus 3 along a conveying direction 1a of the metal strip 1. The metal strip 1 in which the shapes of the side ends have been corrected by the crushing apparatus 3 is gradually curved by the forming roll group 4 to form an open pipe 4a. The open pipe 4a is a pipe which is obtained by butting the side ends on both sides along a width direction of the metal strip 1 against each other and which has a C-shaped cross section having an opening at a portion where the side ends are butted.

The welding apparatus 5 is disposed on a downstream side of the forming roll group 4 along the conveying direction 1a of the metal strip 1 and has a heating coil 50 and a squeezing roll 51. The heating coil 50 is a coil through which a high frequency current is passed. When the open pipe 4a passes through the inside of the heating coil 50, the side ends of the metal strip 1 forming the open pipe 4a is heated (high frequency-heated) and melted. The squeezing roll 51 is configured by a pair of side rolls that restrain an outer periphery of the open pipe 4a, and butts the side ends of the metal strip 1 in the open pipe 4a, melted by heating in the heating coil 50, against each other to join (weld) them.

That is, in the electric resistance welded metal pipe manufacturing apparatus according to the present embodiment, the side ends of the metal strip 1 are butted against each other, and the side ends are then welded by high frequency heating to manufacture an electric resistance welded metal pipe. Although not shown, the downstream of the welding apparatus 5 may be provided with a correcting apparatus for correcting the size and shape of the metal pipe after electric resistance welding (a metal pipe immediately after the welding apparatus 5). When the correcting apparatus is provided, the metal pipe after correction in the correction apparatus corresponds to the electric resistance welded metal pipe 2. On the other hand, when no correcting apparatus is provided, the metal pipe after electric resistance welding corresponds to the electric resistance metal pipe 2.

Figure 2:
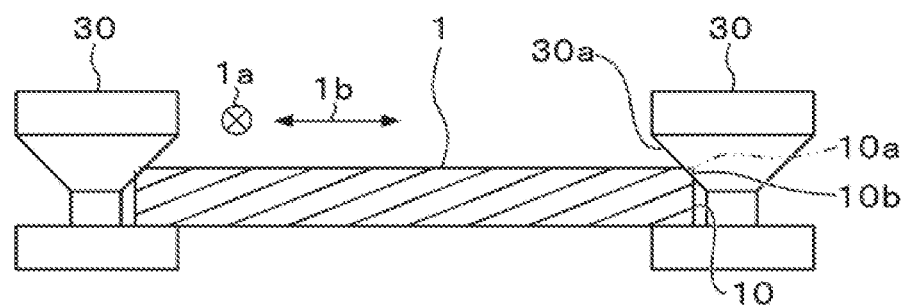
FIG. 2 is a front view showing a main part of a crashing apparatus in FIG. 1.
Figure 3:
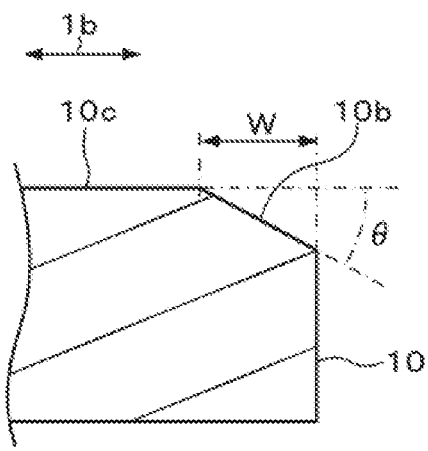
FIG. 3 is an enlarged cross-sectional view of a side end of a metal strip in FIG. 2.

FIG. 2 is a front view showing a main part of the crashing apparatus 3 in FIG. 1 and FIG. 3 is an enlarged cross-sectional view of the side end 10 of the metal strip 1 in FIG. 2. As shown in FIG. 2, the crushing apparatus 3 is provided with a pair of crushing rolls 30 for correcting the shapes of the side ends of the metal strip 1. The crushing rolls 30 are disposed apart from each other along the width direction 1b of the metal strip 1. The metal strip 1 is passed through a space between the crushing rolls 30.

Each side edge 10 of the metal strip 1 before passing through the crushing rolls 30 is provided with an inner surface side corner portion 10a located on the inner surface side of the electric resistance welded metal pipe 2. Each crushing roll 30 is provided with a crushing surface 30a that extends and inclines to a rotation axis of the crushing roll 30. When the metal strip 1 is passed through the space between the clashing rolls 30, the crushing surface 30a is pressed against the inner side corner portion 10a to form an inclined surface 10b on the inner side corner portion 10a. As shown in FIG. 3, the inclined surface 10b has a width W along the width direction 1b of the metal strip 1, and extends and inclines by an angle e relative to an inner peripheral surface 10c of the metal strip 1. The formation of the inclined surface is preferably carried out by pressing the crushing roll against the inner surface side corner portion. In addition, it may also be carried out by the formation with fin pass rolling of a forming roll, cutting with a cutting tool, grinder grinding, or a combination of thereof.

It should be noted that the metal strip 1 used for manufacturing of the electric resistance welded metal pipe 2 may be cut out from a bigger metal strip, and burring and sagging may occur in the side ends 10 during the cutting out of the metal strip 1. When the burring and sagging occur on the side ends 10, it is preferable that the burring side is the inner surface side corner portion 10a in order to form the inclined surface 10b stably.

Figure 4:
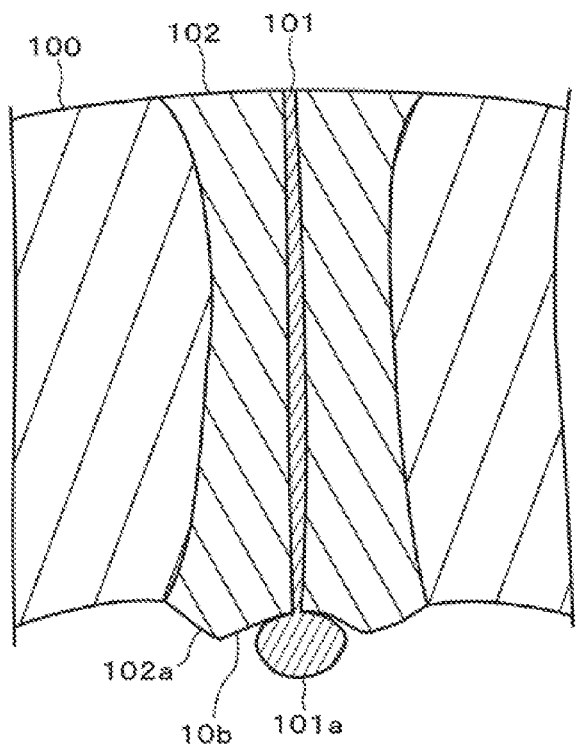
FIG. 4 is an enlarged cross-sectional view of a welded portion of a metal pipe after electric resistance welding by a welding apparatus in FIG. 1.

FIG. 4 is an enlarged cross-sectional view of the welded portion of the metal pipe after electric resistance welding by the welding apparatus 5 in FIG. 1. As shown in FIG. 4, the welded portion of the metal pipe after the electric resistance welding includes a joined portion 101 and a heat affected portion 102. The joined portion 101 is a portion where the side ends 10 of the melted metal strip 1 are joined to each other. The heat affected portion 102 is a portion affected by heating during melting of the side ends 10. The joined portion 101 and the heat affected portion 102 have structures different from a non-heat affected portion 100 due to the influence of heat.

From the joined portion 101, a discharged metal 101a protrudes toward an inner side of the metal pipe. The discharged metal 101a is a solidified molten metal resulting from pushing of the molten metal from the joined portion 101 when the side ends 10 of the metal strip 1 are pressed against each other. The formation of the discharged metal 101a plays a role of discharging an oxide (a penetrator) contained in the molten metal from the joined portion 101.

On the heat affected portion 102, an excess metal 102a is formed. The excess metal 102a is a raised portion of the metal softened in the heat affected portion 102 by a pressure when the side edges 10 of the metal strip 1 are pressed against each other.

In the method for manufacturing the electric resistance welded metal pipe according to the present embodiment, when butting the side ends 10 of the metal strip 1 against each other to weld them in the welding apparatus 5, the side ends 10 are butted and welded to each other such that the inclined surface 10b remains on the excess metal 102a of the metal pipe after electric resistance welding and the discharged metal 101a is not welded to the excess metal 102a as shown in FIG. 4. That is, the electric resistance welded metal pipe 2 according to the present embodiment includes: a metal pipe body having a butted welded portion; the excess metal 102a; and the discharged metal 101a, the excess metal 102a and the discharged metal 101a being formed in the butted welded portion, in which the excess metal 102a has the inclined surface 10b and the discharge metal 101a is not welded to the excess metal 102a.

The discharged metal 101a has decreased toughness due to the influence of heat. Therefore, when the electric resistance metal pipe 2 is subjected to severe processing such as 90° bending for example, cracking may occur in the discharged metal 101a. As described above, the side ends 10 are butted and welded to each other such that the inclined surface 10b remains on the excess metal 102a of the metal pipe after electric resistance welding and the discharged metal 101a is not welded to the excess metal 102a, so that even if the cracking occurs in the discharged metal 101a, the propagation of the cracking to the base material can be avoided. It should be noted that the discharged metal 101a may be in contact with the excess metal 102a as long as the discharged metal 101a is not welded to the excess metal 102a. The presence or absence of welding of the discharged metal 101a to the excess metal 102a can be confirmed by observing the cross section of the welded portion in the metal pipe after electric resistance welding.

Whether or not the inclined surface 10b remains on the excess metal 102a is affected by a heat coefficient and a width W of the inclined surface 10b. The heat coefficient refers to a coefficient represented by the equation: $(I \times V)/(T \times S)$, in which V represents a voltage [kV] applied to the pre-heating coil 50, T represents a thickness [mm] of the metal strip 1, and S represents a pipe manufacturing rate [m/min] (a conveying rate of the metal strip 1), and the heat coefficient can be used as an index representing an amount of heat applied to the side ends 10 when butting the side ends of the metal strip 1 against each other to weld them.

As the heat coefficient is higher, the discharged metal 101a is larger. Therefore, the inclined surface 10b is less likely to remain. Further, as the width W of the inclined surface 10b is wider, an amount of the discharged metal 101a is lower. Therefore, the inclined surface 10b is more likely to remain.

Further, whether or not the discharged metal 101a is not welded to the excess metal 102a is affected by the width W of the inclined surface 10b and the angle θ. As the width W of the inclined surface 10b is wider, the amount of the discharged metal 101a is lower. Therefore, the discharged metal 101a is likely to be not welded to the excess metal 102a. Furthermore, as the angle θ of the inclined surface 10b is larger, the butted area is smaller. Therefore, the discharged metal 101a is less likely to be not welded to the excess metal 102a.

Therefore, by adjusting the angle θ and the width W of the inclined surface 10b, the heat coefficient as well as an upset amount so as to fall within predetermined ranges, the inclined surface 10b can remain on the excess metal 102a of the metal pipe after electric resistance welding and the discharged metal 101a can be non-welded to the excess metal 102a.

The upset amount corresponds to an pressing amount of the side ends 10 when the side ends 10 are joined, and can be represented by a difference between a value obtained by subtracting a spacing distance between the end faces of the open pipe 4a at a position just before being introduced into the squeezing roll 51 from the outer peripheral length of the open pipe 4a at the same position, and the circumferential length of the metal pipe after electric resistance welding. As the position just before being introduced into the squeezing roll 51, a position that is 1 m before the squeeze roll 51 can be set.

As a tensile strength of the metal strip 1 is higher, the cracking in the discharged metal 101a is likely to be generated. In particular, when the tensile strength of the metal strip 1 is 700 MPa or more, the cracking is significantly generated in the discharged metal 101a. The ability to avoid the propagation of the cracking to the base material even if the cracking occurs in the discharged metal 101a according to the method according to the present embodiment is particularly useful when the tensile strength of the metal strip 1 is 700 MPa or more.

According to such a method for manufacturing the electric resistance welded metal pipe and the electric resistance welded metal pipe, the side ends are butted and welded to each other such that the inclined surface 10b remains on the excess metal 102a of the metal pipe 2 after electric resistance welding and the discharged metal 101a is not welded to the excess metal 102a, so that the propagation of the cracking to the base material can be avoided even if the cracking is generated in the discharged metal 101a. This configuration is particularly useful when the tensile strength of the metal strip 1 is 700 MPa or more.

In applications requiring high strength (high hardness), the electric resistance welded metal pipe may be subjected to a heat treatment after being processed by a component producer. By using an electric resistance welded metal pipe with good hardenability, which can be adjusted to a predetermined strength (hardness) by a heat treatment at a relatively low temperature for a relatively short period of time, the component producer can reduce heat treatment costs. It is useful to adjust a chemical composition of the metal strip 1 and the base material of the metal pipe body in order to obtain the electric resistance welded metal pipe with good hardenability as well as bendability. Using the metal strip 1 having a composition in which a chemical composition of the base material includes from 0.20 to 0.40% by mass of C, from 0.05 to 0.45% by mass of Si, from 1.0 to 1.5% by mass of Mn, from 0.05 to 0.40% by mass of Cr, 0.03% by mass or less of P, 0.025% by mass or less of S, from 0.0005 to 0.006% by mass of B and from 0.01 to 0.06% by mass of Ti, the balance being Fe and unavoidable impurities, the side ends of the metal strip are butted and welded to each other such that the inclined surface 10b remains on the excess metal 102a of the metal pipe after electric resistance welding and the discharged metal 101a is not welded to the excess metal 102a, whereby the electric resistance welded metal pipe having good bendability and good hardenability can be obtained.

<C: From 0.20 to 0.40% by Mass>

C is an element effective for strengthening. When the C content is less than 0.20% by mass, sufficient strength cannot be obtained. On the other hand, when the C content is more than 0.40% by mass, the workability is lowered. The range of the C content is preferably from 0.24 to 0.37% by mass.

<Si: From 0.05 to 0.45% by Mass>

Si is an element that contributes to improvement of strength by solid solution. When the Si content is less than 0.05% by mass, sufficient strength cannot be obtained. On the other hand, when the Si content is more than 0.45% by mass, toughness and weldability tend to decrease. The range of the Si content is preferably from 0.1 to 0.4% by mass.

<Mn: From 1.0 to 1.5% by Mass>

Mn is an element effective for improving strength and hardenability. When the Mn content is less than 1.0% by mass, no remarkable addition effect can be obtained. On the other hand, when the Mn content is more than 1.5% by mass, toughness of the weld portion tends to decrease. The range of the Mn content is preferably from 1.10 to 1.40% by mass.

<Cr: From 0.05 to 0.40% by Mass>

Cr is an element effective for improving tempering softening resistance of the welded heat affected portion. When the Cr content is less than 0.05% by mass, no remarkable addition effect can be obtained. On the other hand, when the Cr content is more than 0.40% by mass, weldability is decreased. The range of the Cr content is preferably from 0.10 to 0.30% by mass.

<P: From 0.03% by Mass or Less>

P is an element that adversely affects toughness. When the P content is more than 0.03% by mass, a decrease in toughness will be remarkable. The range of the P content is preferably 0.025% by mass or less. In addition, the content of P does not include zero.

<S: 0.025% by Mass or Less>

S is an element that adversely affects toughness. When the S content is more than 0.025% by mass, a decrease in toughness will be remarkable. The range of the S content is preferably 0.020% by mass or less. In addition, the content of S does not include zero.

<B: From 0.0005 to 0.006% by Mass>

B is an element effective for improving hardenability and toughness by a minor addition amount. When the B content is less than 0.0005% by mass, no remarkable addition effect can be obtained. On the other hand, when the B content is more than 0.006% by mass, the effect is almost saturated. The range of the B content is preferably from 0.001 to 0.005% by mass.

<Ti: From 0.01 to 0.06% by Mass>

Ti has an effect of increasing the effective amount of B that improves hardenability, and requires addition in an amount of at least 0.01% by mass or more. When the Ti content is more than 0.06% by mass, weldability tends to decrease. The range of the Ti content is preferably from 0.02 to 0.05% by mass.

The present inventors manufactured the electric resistance welded metal pipe 2 using metal strips 1 of the following two types (base materials A and B) according to the method for manufacturing the electric resistance metal pipe of the present embodiment. The thickness of each base material of each metal trip 1 was 4.5 mm, and the outer diameter of each electric resistance welded metal pipe 2 was φ30.0 mm. The side ends of each metal strip 1 were butted against each other such that the inclined surface 10b remained on the excess metal 102a of each metal pipe after electric resistance welding and the discharged metal 101a was not welded to the excess metal 102a. As a result of subjecting the resulting electric resistance welded pipe 2 to 90° bending, any position where the cracking was propagated to the base material was not observed, <Base Material A>

C: 0.26% by mass; Si: 0.25% by mass; Mn: 1.25% by mass; Cr: 0.20% by mass; P: 0.01% by mass or less; S: 0.005% by mass or less; Ti 0.02% by mass; B: 0.003% by mass, the balance being Fe and unavoidable impurities.

<Base Material B>

C: 0.34% by mass; Si: 0.18% by mass; Mn: 1.35% by mass; Cr: 0.14% by mass; P: 0.012% by mass; S: 0.008% by mass; Ti: 0.035% by mass; B: 0.004% by mass, the balance being Fe and unavoidable impurities.

DESCRIPTION OF REFERENCE NUMERALS 1 metal strip
2 electric resistance welded metal pipe
30 crushing roll
50 heating coil
10 side end
10a inner side corner portion
10b inclined surface
101a discharged metal
102a excess metal.

What is claimed is:

1. A method for manufacturing an electric resistance welded metal pipe by butting side ends of a metal strip against each other and then welding the side ends by high frequency heating to manufacture an electric resistance welded metal pipe, each side end being provided with an inner surface side corner portion located on an inner surface side of the electric resistance welded metal pipe,
   wherein the method comprises a step of forming an inclined surface at the inner surface side corner portion before butting the side ends of the metal strip; and
   wherein the side ends are butted and welded to each other such that the inclined surface remains on an excess metal of the metal pipe after electric resistance welding and a discharged metal is not welded to the excess metal.

2. The method according to claim 1, wherein the forming of the inclined surface is carried out by pressing a crushing roll against the inner surface side corner portion.

3. The method according to claim 1, wherein a base material of the metal strip has a tensile strength of 700 MPa or more.

4. The method according to claim 1, wherein the base material of the metal strip has a chemical composition comprising from 0.20 to 0.40% by mass of C, from 0.05 to 0.45% by mass of Si, from 1.0 to 1.5% by mass of Mn, from 0.05 to 0.40% by mass of Cr, 0.03% by mass or less of P, 0.025% by mass or less of S, from 0.0005 to 0.006% by mass of B and from 0.01 to 0.06% by mass of Ti, the balance being Fe and unavoidable impurities.

* * * * *